United States Patent [19]

Hanson

[11] 4,273,262
[45] Jun. 16, 1981

[54] ROTARY DISPENSER APPARATUS

[76] Inventor: Spencer R. Hanson, Rte. 2, Box 217, Blair, Wis. 54616

[21] Appl. No.: 855,296

[22] Filed: Nov. 28, 1977

[51] Int. Cl.³ ............................................. A01C 19/00
[52] U.S. Cl. .................................... 222/144; 222/169; 222/282
[58] Field of Search ............... 222/169, 170, 171, 172, 222/144, 282; 221/186, 190

[56] References Cited

U.S. PATENT DOCUMENTS

| | | | |
|---|---|---|---|
| 73,307 | 1/1868 | Downer et al. | 222/169 |
| 375,768 | 1/1888 | Peabody | 222/170 |
| 434,985 | 8/1890 | Harris et al. | 222/169 |
| 792,918 | 6/1905 | Ohlendorf et al. | 222/170 |
| 2,315,022 | 3/1943 | Smith | 222/169 X |
| 3,645,422 | 2/1972 | Cretors | |

Primary Examiner—Robert J. Spar
Assistant Examiner—Frederick R. Handren
Attorney, Agent, or Firm—Carl M. Lewis

[57] ABSTRACT

A rotary driven drum-shaped dispenser for fluid materials is disclosed. The drum is comprised of a plurality of nested rings each of which has a plurality of arcuate channels through which the fluid material is passed during rotation of the drum. An adjustable valve is positioned at the inlet end of each flow channel. The end bells of the drum have covered access openings for filling the drum with fluid material to be dispensed. A divider within the drum separates the drum chamber into two chambers so that separate materials may be dispensed simultaneously without pre-mixing.

12 Claims, 8 Drawing Figures

ROTARY DISPENSER APPARATUS

BACKGROUND OF THE INVENTION

In and about modern farms there is a need for a dispenser which may be quickly and easily adapted to many applications. Thus, a dispenser may be used for dispensing seeds, feed supplements, fertilizer, salt for deicing walks and driveways, larvicides, fungicides, and so forth. However, such a dispenser would have to be adjustable in capacity and rate of flow. Moreover, it would have to handle fluid materials ranging from very small granules to larger pellets or capsules. In some instances, such a dispenser should be capable of dispensing more than one material simultaneously, but separately. Furthermore, such a dispenser should be simple in construction and capable of being driven by a variety of power sources. No general purpose dispenser appears to be available which meets these requirements.

SUMMARY OF THE INVENTION

It is the prime object of the invention to meet the requirements set forth above for a general pulse dispenser which is simple in construction and low in cost. It is a further object of this invention to provide a dispenser capable of being adjusted for different dispensing rates and for different materials. It is still another object of this invention to provide a rotary dispenser which may be expanded or contracted in size in accordance with the needs of the particular application. Moreover, it is an object of this invention to provide a dispenser which is capable of dispensing at least two materials simultaneously without premixing. And still another object of this invention is to provide a dispenser which prevents stratification of the material being dispensed to thereby maintain uniform composition of the dispensed material. This is accomplished by the tumble action of the material within the drum as it is rotated. And it is still another object of a modified form of my invention to provide a rotary dispenser wherein the rate of dispensing may be changed by the mere reversal of the direction of rotation.

More specifically, this invention relates to a dispenser apparatus comprising: a drum adapted to be rotated about a non-vertical axis; said drum defining a chamber therein for fluid material to be dispensed therefrom; said drum having an annular side wall and at least one axial end bell fixedly interconnected for rotation about said axis; said annular side wall having at least one dispenser ring provided with an arcuate channel; said channel having a radially inner wall and a radially outer wall; a radial inlet opening in said radially inner wall communicating said channel with said chamber; a radial outlet opening in said radially outer wall communicating said channel with space external to said drum; said inlet and outlet openings being angularly displaced along said channel from each other whereby fluid material passing into said inlet opening and out of said outlet opening must pass longitudinally through a length of said channel.

Other objects and advantages of this invention should become apparent as this specification proceeds to describe the invention with reference to the drawings.

DETAILED DESCRIPTION

Figure 1:
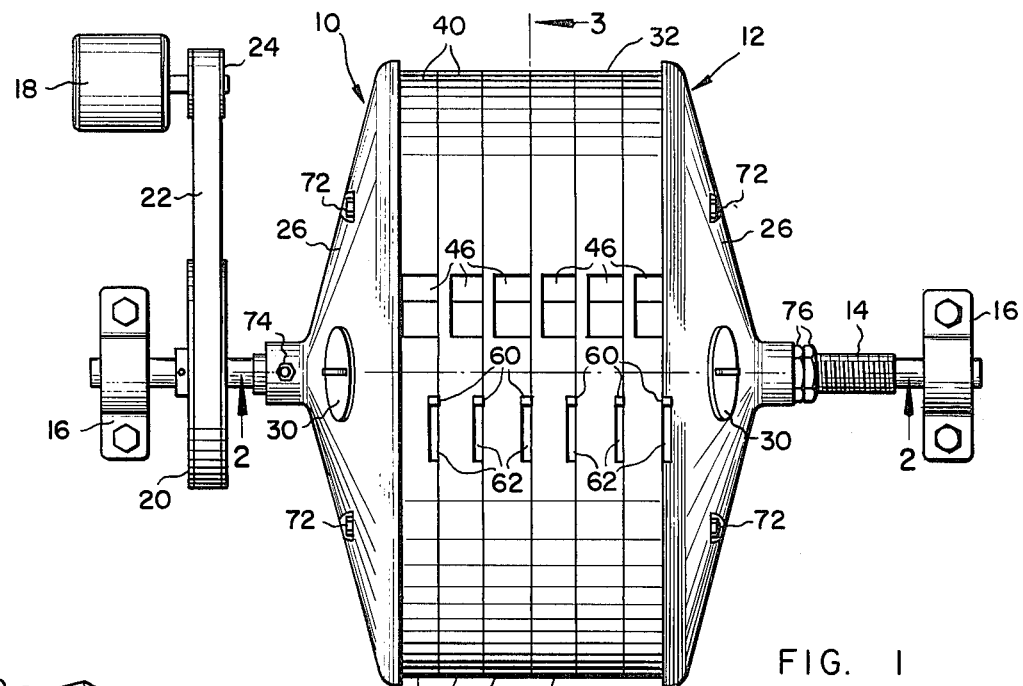
FIG. 1 is a top view of the dispenser and drive mechanism incorporating the instant invention.
Figure 5:
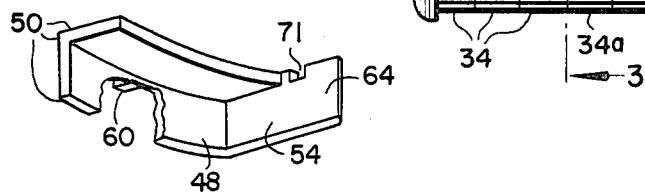
FIG. 5 is a perspective of one of the adjustable inlet valves.

Now with reference to the drawings, it will be seen that there is provided a driven rotary dispenser 10 having a drum 12 mounted for rotation with a shaft 14 in removable bearings 16. A drive motor 18 is drivingly connected to shaft 14 by way of a drive sheave 20, drive belt 22, and motor sheave 24.

The drum 12 may be mounted upon a seeding implement or above a feed conveyor or upon any other implement as may be required for the particular application. Furthermore, it may be driven by a power takeoff from an implement if so desired.

Now, considering the construction of drum 12, it will be seen that drum 12 includes a pair of spaced end bells 26 which are preferably identical in construction. Each has an access opening 28 provided with a cover 30. Each end bell is generally conical in shape having its concave side facing but spaced from the other end bell.

The annular side wall 32 of drum 12 between end bells 26 is comprised of a plurality of identical dispenser rings 34 which may be molded of transparent or translucent plastic material. This enables one to visually determine the amount of fluid material remaining in the drum. Each ring 34 has a plurality of arcuate channels 36 formed between the radially inner wall 38 and the radially outer wall 40 thereof. Inner wall 38 is provided with a plurality of radial inlet openings 42 communicating the channels 36 with the drum chamber 44. Outer wall 40 is provided with a plurality of radial outlet openings 46 communicating channels 36 with the space external to the drum 12. It will be understood that the fluid material within the drum chamber 44 to be dispensed must pass through an inlet opening 42 along the length of a channel 36 and out of an outlet opening 46 upon being dispensed from drum 12.

To control the flow of fluid material entering inlet openings 42 I have provided an adjustable valve 48 provided with surfaces 50 for being adjustably guided along channel 36. The actual opening 58 between channel 36 and chamber 44 is limited by the spacing between an edge 52 of opening 58 and the forward wall 54 of valve 48. By adjusting valve 48 in the direction of drum rotation as indicated by arrow 56 in FIG. 3, the actual or limited inlet opening 58 may be increased. By sliding valve 48 in the opposite direction along channel 36, opening 58 will be decreased in size. Valves 48 have an adjustment tab 60 extending radially outwardly through a slot 62 in outer wall 40. The forward wall 54 of valve 48 extends radially inwardly to form a weir 64 for controlling the flow of fluid material into opening 58. A side dam 66 which is integral with ring 34 and positioned to one axial end of weir 64 cooperates with the weir to more uniformly control the flow through opening 58 despite variations in the level of fluid materials within drum chamber 44. It is believed that the weir and side dams on each side thereof function to shield the opening 58 against excessive exposure to the material within drum 44.

Figure 2:
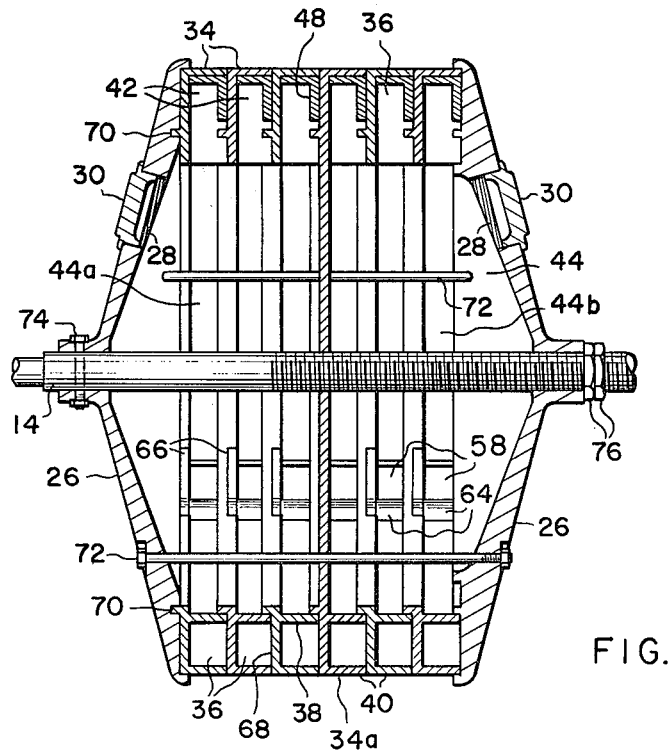
FIG. 2 is a partial vertical section of the dispenser drum taken along line 2—2 of FIG. 1.

The annular end wall 68 connecting radially inner and outer walls 38 and 40 extends radially inward of inner wall 38 and is provided with an axially extending annular ridge 70. When rings 34 are superposed in nested relationship ridge 70 of one ring cooperates with the inner wall 38 of the adjacent ring to maintain concentric alignment of rings 34. As seen in FIG. 2 inner and outer walls 38 and 40 and end wall 68 define the legs and base of a U-shaped cross section closed by the end wall of an adjacent ring. The valve 48 is notched at 71 to accommodate ridge 70.

Valves 48 are retained in their adjusted position by frictional engagement with the side walls of the channel 36 and the frictional engagement with the adjacent ring 34. This frictional engagement is enhanced by compressing the rings 34 between the end bells 26. Rings 34 may be clamped between end bells 26 by way of axially extending bolts 72. One of the end bells is drivingly connected to shaft 14 by way of cross pin 74 which also retains the end bell in fixed axial position with respect to shaft 14. Shaft 14 may be provided with an external thread upon which a pair of drum retainer locknuts 76 may be secured. Thus, either shaft 14 or bolts 72 may be used to retain rings 34 and adjustable valves 48 in position.

End wall 68 of one of the rings 34a may extend inwardly to shaft 14 thereby dividing drum chamber 44 into a first chamber 44a and a second chamber 44b. It will be evident that by placing a fluid material in chamber 44a which is different from the fluid material placed in chamber 44b that it is possible to simultaneously dispense the separate materials without intermixing prior to being dispensed.

The large access openings 28 in each of end bells 26 permit easy filling of the dispenser. Furthermore, they permit internal adjustment of the valves 48 in the event valves without external tabs are used. Use of such valves without external adjustment tabs 60 may be desirable in some instances to prevent tampering.

The dispenser is operated by first adjusting the valves 48 as hereinbefore described. The material to be dispensed is passed into the chamber 44 of drum 12 through openings 28. After having positioned the covers 30 to close access openings 28, the drum is rotated by way of shaft 14 about a non-vertical axis. In most instances, it is preferable to rotate drum 12 about a horizontal axis. Upon rotation the material within chamber 44 passes through inlet openings 58, through channels 36 and out of outlets 46. It has been found that by constructing the dispenser as shown and described, a surprisingly uniform distribution flow rate may be obtained. The size of chambers 44 may be adjusted by adding or subtracting one or more rings. If desired, all the valves in one of the rings may be completely closed whereby such ring serves merely as a spacer. The dispenser drum has no parts which move relative to each other during operation. It is simple in construction and easy to clean. It may be quickly assembled and disassembled, expanded and contacted, adjusted and modified. The end bells and rings may be constructed of a non-corrosive plastic for use with a variety of materials. The dispenser may be mounted on substantially any implement or apparatus for uniformly dispensing one or more materials either simultaneously together or simultaneously separately.

Figure 8:
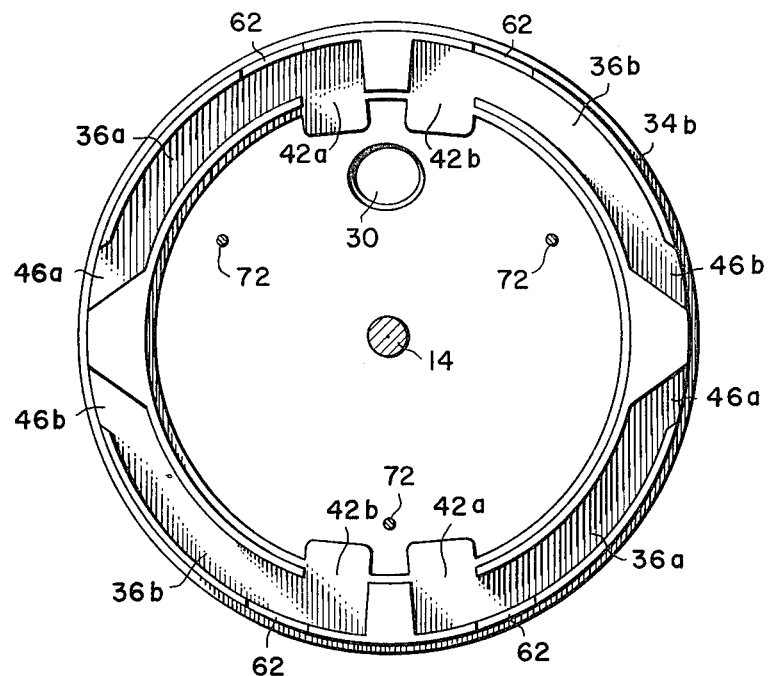
FIG. 8 is a view similar to FIG. 4 of a modified form of the invention.
Figure 6:
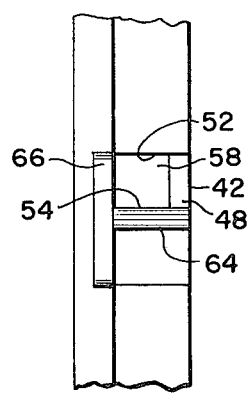
FIG. 6 is a detail view taken at 6—6 of FIG. 3 in the vicinity of an inlet opening to one of the channels thereof.

The modified ring 34b of FIG. 8 is shown having two arcuate channels 36a wherein the inlet openings 42a are clockwise of their outlet openings 46a and two arcuate channels 36b wherein the inlet openings 42b are counterclockwise of their outlet openings 46b. The valve to be used with ring 34b may be similar to those used with ring 34. However, it will be appreciated that inlets 42b may be provided with valves having an adjustment tab on the opposite side as compared with those valves used at outlet openings 42a so that all the slots 62 for accommodating adjustment tabs 60 may be positioned at one axial end of ring 34b for convenience of molding the ring.

Figure 3:
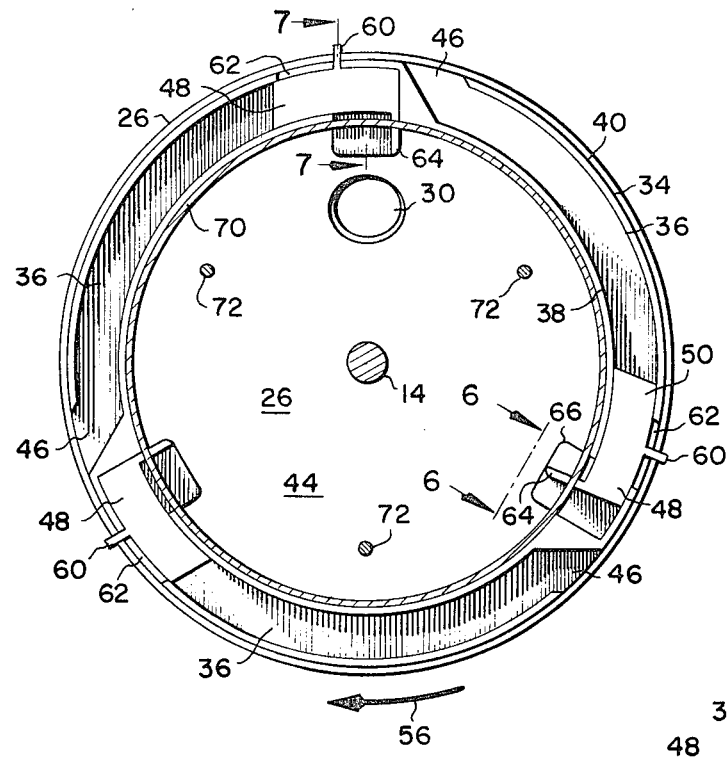
FIG. 3 is a vertical section taken in the axial direction along line 3—3 of FIG. 1 primarily illustrating one of the dispenser rings thereof.
Figure 7:
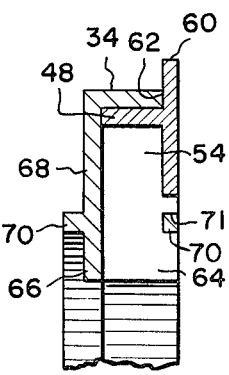
FIG. 7 is a detail section taken in FIG. 3 showing a section of the channel and valve of one of the dispenser rings thereof.

During rotation of the drum in the clockwise direction as indicated in FIG. 3, the inlets 42a of channel 36a will lead outlets 46a while inlets 42b of channels 36b will lag outlets 46b. During rotation of the drum in the opposite or counterclockwise direction, the inlets 42a of channel 36a will lag outlets 46a while inlets 42b of channels 36b will lead outlets 46b. It will be further understood that it is possible to mix rings, some of which have exclusively channels 36a and others of which have exclusively channels 36b to obtain similar results.

Figure 4:
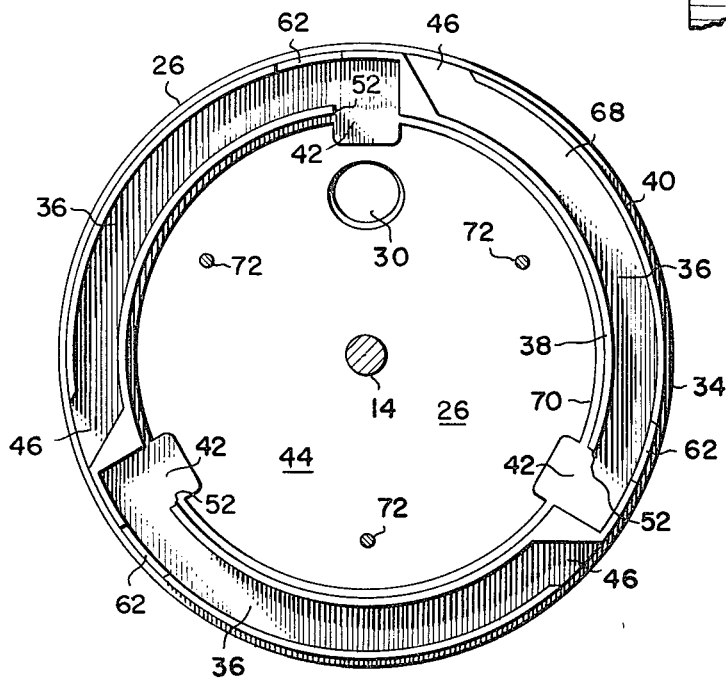
FIG. 4 is a view similar to FIG. 3 but having the adjustable inlet valves removed to more clearly show the dispenser ring channels.

The operation of the modified ring 34b of FIG. 8 is similar to the rings of FIGS. 3 and 4. However, because of the reverse location of the inlet to outlet openings, the side of the inlet opening at which the weir would be located in relation to the direction of rotation and the relative adjustment of the valves in channels 36b as compared to channels 36a, it is possible to obtain substantially different flow rates from the dispenser when operated in one direction of rotation as compared to the other direction of rotation. This is true whether or not channels 36a and 36b are mixed on the same ring or provided exclusively on separate rings of the same dispensers.

It will also be appreciated that in a dispenser composed of rings 34b and having a divider means dividing the drum chamber into two chambers, it is possible to obtain greater flow from one of the drum chambers than the other simply by selecting direction of rotation.

Having now described in detail the preferred embodiment of my invention, I contemplate that many changes may be made without departing from the scope and spirit of the invention and I accordingly wish my invention to be limited only by the following claims.

I claim:

1. Apparatus for dispensing a fluid material comprising: a drum adapted to be rotated about a non-vertical axis; said drum defining a chamber therein for fluid material to be dispensed therefrom; said drum having an annular side wall and at least one axial end bell fixedly interconnected for rotation together about said axis; said annular side wall having at least one dispenser ring provided with an arcuate channel; said channel having a radially inner wall and a radially outer wall; a radial inlet opening in said radially inner wall communicating said channel with said chamber; a radial outlet opening in said radially outer wall communicating said channel with space external to said drum; said inlet and outlet openings being angularly displaced from each other about said axis along said channel whereby fluid material passing into said inlet opening and out of said outlet opening must pass through a length of said channel; an adjustable inlet valve disposed at said inlet opening for adjusting the actual size of said inlet opening; said valve including a weir extending across said inlet opening in the direction of said axis on the leading side of said inlet opening with respect to the direction of rotation about said axis.

2. The apparatus as defined by claim 1 including a side dam positioned axially to one end of said weir.

3. The apparatus as defined by claim 2 wherein said side dam is integral with said ring.

4. The apparatus as defined by claim 2 including a second side dam positioned axially to the other end of said weir.

5. The apparatus as defined by claim 1 wherein said drum has a plurality of arcuate channels wherein the inlet of at least one channel is clockwise of the outlet thereof and the inlet of another channel is counterclockwise of the outlet thereof.

6. The apparatus as defined by claim 5 wherein said one channel and said other channel are disposed on one ring.

7. Apparatus for dispensing a fluid material comprising: a drum adapted to be rotated about a non-vertical axis; said drum defining a chamber therein for fluid material to be dispensed therefrom; said drum having an annular side wall and at least one axial end bell fixedly interconnected for rotation together about said axis; said annular side wall having at least one dispenser ring provided with an arcuate channel; said channel having a radially inner wall and a radially outer wall; a radial inlet opening in said radially inner wall communicating said channel with said chamber; a radial outlet opening in said radially outer wall communicating said channel with space external to said drum; said inlet and outlet openings being angularly displaced from each other about said axis along said channel whereby fluid material passing into said inlet opening and out of said outlet opening must pass through a length of said channel; an adjustable inlet valve disposed at said inlet opening for adjusting the actual size of said inlet opening; and an adjustment tab extending radially outwardly from said valve through a slot in said radially outer wall whereby the position of said valve along said channel may be adjusted externally of said drum.

8. Apparatus for dispensing a fluid material comprising: a drum adapted to be rotated about a non-vertical axis; said drum defining a chamber therein for fluid material to be dispensed therefrom; said drum having an annular side wall and at least one axial end bell fixedly interconnected for rotation together about said axis; said annular side wall having first and second dispenser rings; each of said rings being positioned along and extending about said axis and having an axially extending radially outer wall and an axially extending radially inner wall; said radially outer wall being spaced radially outwardly of and axially coextensive with said radially inner wall; an arcuate channel radially between and axially coextensive with said radially inner wall and said radially outer wall; a radial inlet opening in said radially inner wall communicating said channel with said chamber; a radial outlet opening in said radially outer wall communicating said channel with space external to said drum; said inlet and outlet openings being angularly displaced from each other about said axis along said channel whereby fluid material passing into said inlet opening and out of said outlet opening must pass through a length of said channel; and said channel of said first ring being closed in a direction of said axis by said second ring.

9. Apparatus for dispensing a fluid material comprising: a drum adapted to be rotated about a non-vertical axis; said drum defining a chamber therein for fluid material to be dispensed therefrom; said drum having an annular side wall and at least one axial end bell fixedly interconnected for rotation together about said axis; said annular side wall having first and second dispenser rings; each of said rings being positioned along and extending about said axis and having an axially extending radially outer wall and axially extending radially inner wall; said radially outer wall being spaced radially outwardly of and axially coextensive with said radially inner wall; an arcuate channel radially between and axially coextensive with said radially inner wall and said radially outer wall; a radial inlet opening in said radially inner wall communicating said channel with said chamber; a radial outlet opening in said radially outer wall communicating said channel with space external to said drum; said inlet and outlet openings being angularly displaced from each other about said axis along said channel whereby fluid material passing into said inlet opening and out of said outlet opening must pass through a length of said channel; an adjustable inlet valve disposed at said inlet opening for adjusting the actual size of said inlet opening; and said valve having arcuate guide surfaces slidably engaging said radially inner and said radially outer walls for positioning said valve during adjustment.

10. Apparatus as defined by claim 9 wherein said channel of said first ring is closed by an annular end wall connecting said radially inner and outer walls of said second ring.

11. Apparatus as defined by claim 10 including an axially protruding ridge on said annular end wall for positioning said first ring relative to said second ring to maintain said first and second rings in concentric alignment.

12. Dispenser drum apparatus for dispensing a fluid material including a dispenser ring for forming a portion of an annular side wall of a dispenser chamber from which a fluid material is to be dispensed; said dispenser ring extending about and spaced from an axis; said dispenser ring including a radially outer wall and a radially inner wall; said radially outer wall being spaced radially outwardly of and axially coextensive with said radially inner wall; an arcuate channel positioned radially between and axially coextensive with said radially inner wall and said radially outer wall; said dispenser ring having an end wall closing the side of said channel in one direction of said axis; said dispenser ring having a U-shaped cross section defined by said radially inner and outer walls and said end wall; said dispenser ring being adapted to be placed adjacent a second identical ring for thereby closing said channel; a radial inlet opening in said radially inner wall communicating said channel with said chamber; a radial outlet opening in said radially outer wall communicating said channel with space external to said drum; said inlet and outlet openings being angularly displaced from each other about said axis along said channel whereby fluid material passing into said inlet opening and out of said outlet opening must pass through a length of said channel.

* * * * *